(12) United States Patent
Shastri et al.

(10) Patent No.: US 8,364,042 B2
(45) Date of Patent: Jan. 29, 2013

(54) OPTICAL INTERCONNECTION ARRANGEMENT FOR HIGH SPEED, HIGH DENSITY COMMUNICATION SYSTEMS

(76) Inventors: Kalpendu Shastri, Orefield, PA (US); Bipin Dama, Bridgewater, NJ (US); Mark Webster, Bethlehem, PA (US)

( * ) Notice: Subject to any disclaimer, the term of this patent is extended or adjusted under 35 U.S.C. 154(b) by 420 days.

(21) Appl. No.: 12/796,868

(22) Filed: Jun. 9, 2010

(65) Prior Publication Data
US 2010/0316391 A1 Dec. 16, 2010

Related U.S. Application Data

(60) Provisional application No. 61/186,718, filed on Jun. 12, 2009.

(51) Int. Cl.
*H04B 10/00* (2006.01)
(52) U.S. Cl. .................................. 398/141; 398/189
(58) Field of Classification Search .......... 398/140–141, 398/189
See application file for complete search history.

(56) References Cited

U.S. PATENT DOCUMENTS

| | | | |
|---|---|---|---|
| 7,099,400 B2 | 8/2006 | Yang et al. | |
| 7,230,979 B2 | 6/2007 | Gorecki et al. | |
| 7,343,535 B2 | 3/2008 | Lai | |
| 7,447,354 B2 | 11/2008 | Sasaki | |
| 7,483,597 B2 | 1/2009 | Shastri et al. | |
| 7,570,708 B2 | 8/2009 | Laturell et al. | |
| 8,059,966 B2 * | 11/2011 | Igarashi et al. | 398/179 |
| 8,238,014 B2 * | 8/2012 | Kucharski et al. | 359/238 |
| 2001/0035997 A1 | 11/2001 | Agazzi | |
| 2002/0196510 A1 | 12/2002 | Hietala et al. | |
| 2003/0058504 A1 * | 3/2003 | Cho et al. | 359/161 |
| 2003/0180055 A1 | 9/2003 | Azadet | |
| 2004/0151507 A1 | 8/2004 | Agazzi | |
| 2007/0071453 A1 | 3/2007 | Liu et al. | |
| 2009/0195860 A1 * | 8/2009 | Arahira et al. | 359/303 |
| 2010/0060972 A1 * | 3/2010 | Kucharski et al. | 359/290 |
| 2010/0316388 A1 * | 12/2010 | Shastri et al. | 398/115 |
| 2010/0316391 A1 * | 12/2010 | Shastri et al. | 398/141 |

OTHER PUBLICATIONS

Bakopoulous, P. et al. "Compact all-optical packet clock and data recovery circuit using generic integrated MZI switches", Aug. 22, 2005/vol. 13, No. 17/OPTICS EXPRESS, pp. 6401-6406.

* cited by examiner

*Primary Examiner* — Agustin Bello

(57) ABSTRACT

An optical interconnection arrangement for use in high data applications is presented that eliminates the need for extensive serialization/de-serialization (SERDES) functionality by utilizing pulse amplitude modulation (PAM) techniques to represent the data in the optical domain while utilizing a separate channel for transmitting an optical clock signal, eliminating the need for clock recovery circuitry on the receive end of the arrangement.

10 Claims, 5 Drawing Sheets

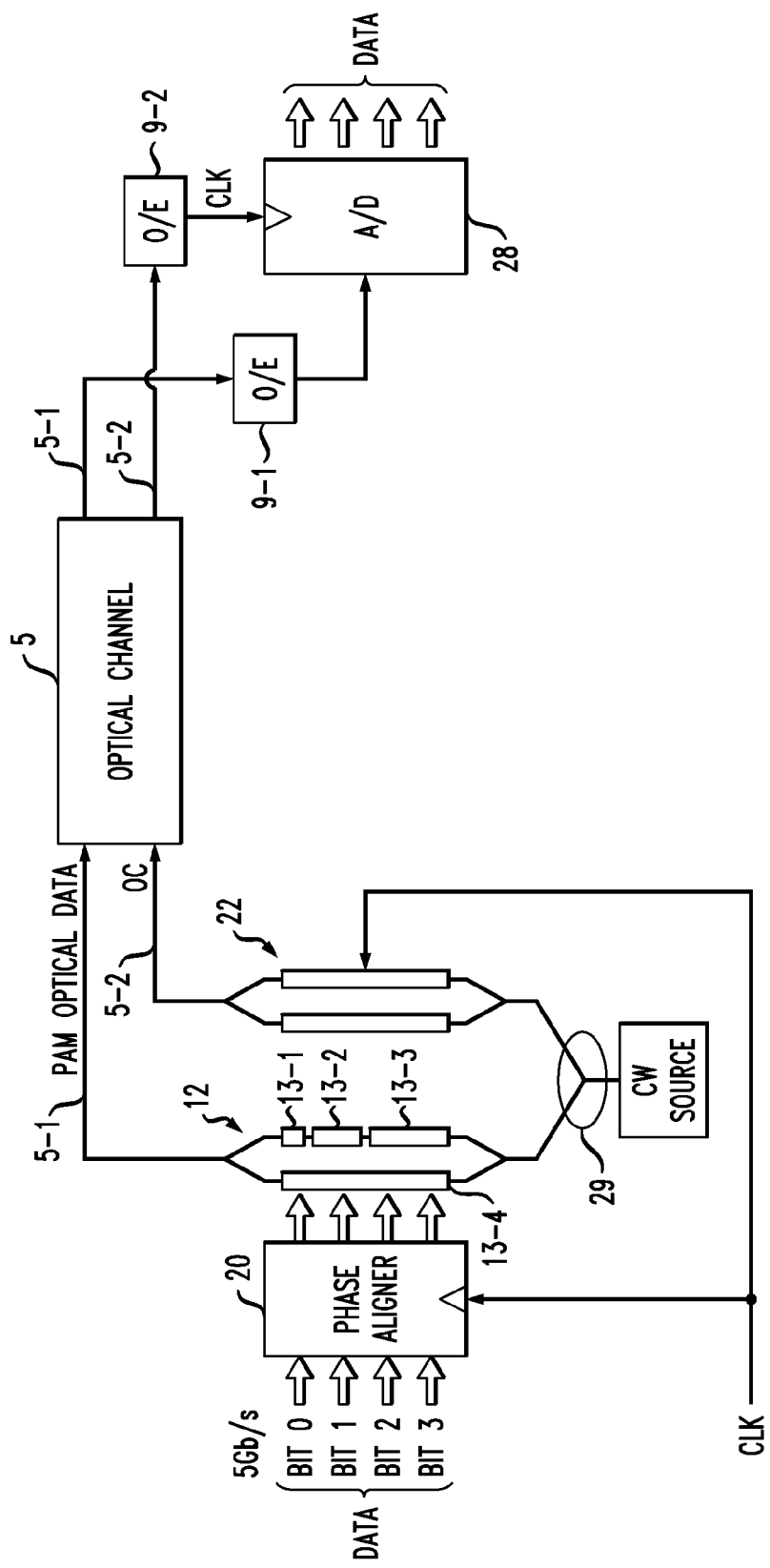

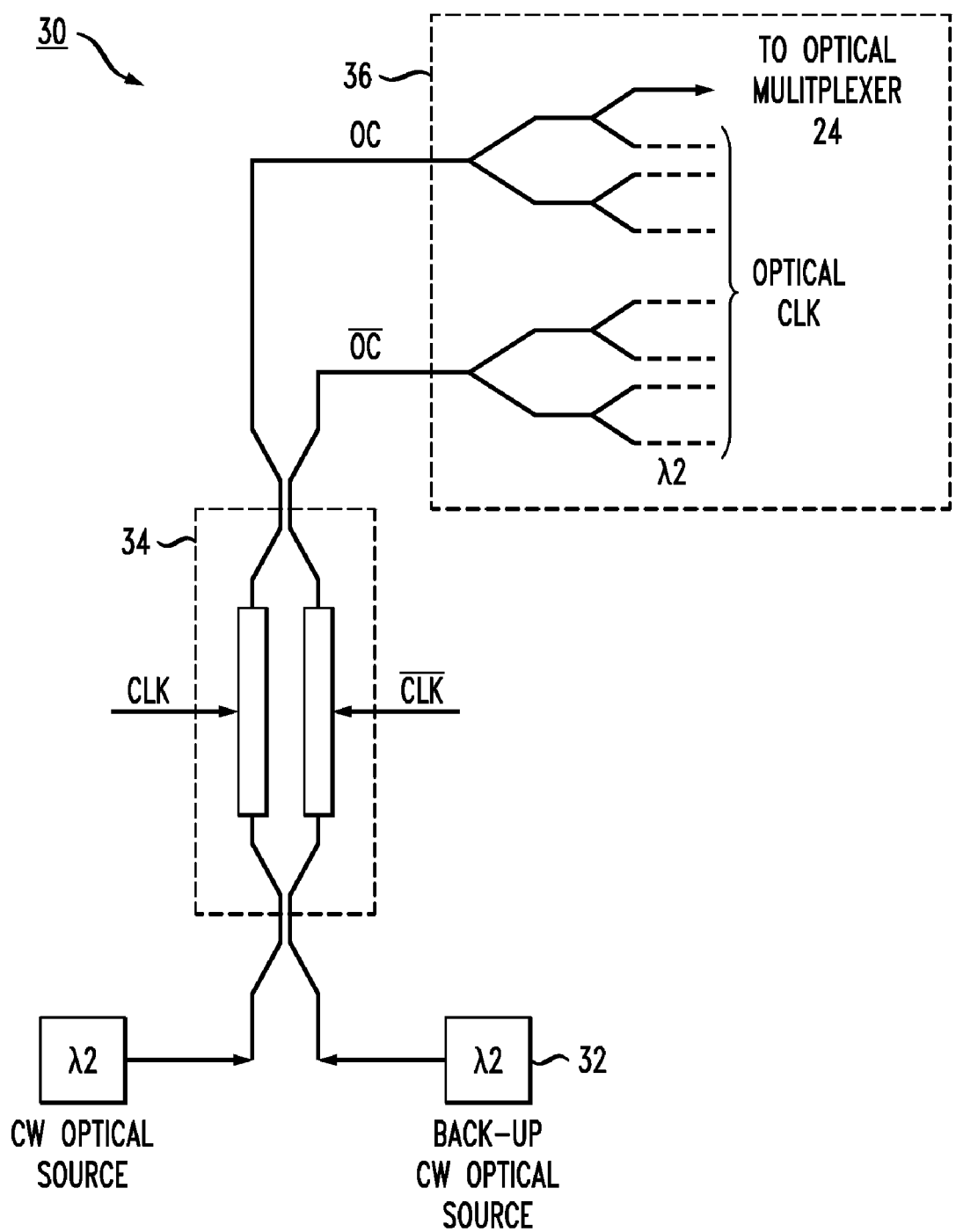

OPTICAL INTERCONNECTION ARRANGEMENT FOR HIGH SPEED, HIGH DENSITY COMMUNICATION SYSTEMS

CROSS-REFERENCE TO RELATED APPLICATIONS

This application claims the benefit of U.S. Provisional Application No. 61/186,718, filed Jun. 12, 2009 and herein incorporated by reference.

TECHNICAL FIELD

The present invention relates to an optical interconnection arrangement and, more particularly, to an arrangement that reduces the need for extensive serialization/de-serialization (SERDES) functionality by utilizing pulse amplitude modulation (PAM) techniques in combination with a separate transmission channel for a clock signal.

BACKGROUND OF THE INVENTION

Due to the continuing demand for computing and networking applications, there is a growing demand for high performance computing (HPC) platforms, as well as large data centers. In either case, the interconnects between computer servers or network nodes have not been able to keep up with the growth in computing power within the chip or server. The bottlenecks include, but are not limited to, chip-to-chip communication power, size and latency, as well as server-to-server communication power, size and latency. In more recent applications, optical fiber has been used as the physical link between the chips (or the servers) inasmuch as the bandwidth of the fiber is significantly greater than the standard copper interconnect.

The processing on a chip itself is generally performed using a parallel word that is multiple bits in width (a typical parallel word having a width of 8 bits, 16 bits, 32 bits or 64 bits). Transferring this information from a first chip and onto a second chip (or other element) usually requires the parallel word to be converted to serial form in order to reduce the pin count at the edge of the chip, where the physical packaging would otherwise need to deal with, perhaps, a large, parallel number of output leads.

As a result, a serialization process is usually performed at the edge of the chip, creating serial data from the parallel word. At the receive end of the communication path, a de-serialization function is required to re-format the incoming serial data stream back into the parallel word structure used within the chip on the receive side of the process. The combination of these serialization and de-serialization processes are often referred to in the art as "SERDES". Additionally, the receive end of the system must perform clock recovery on the incoming serialized data stream in order to properly re-create the parallel word.

The SERDES and clock recovery processes are problematic in that they consume a significant amount of power, while adding latency to a process where high speed operation is demanded and expected.

Thus, a need remains in the art for an optical-based interconnect system with improved operational characteristics.

SUMMARY OF THE INVENTION

The needs remaining in the prior art are addressed by the present invention, which relates to an optical interconnection arrangement and, more particularly, to an arrangement that reduces the need for extensive serialization/de-serialization (SERDES) functionality by utilizing pulse amplitude modulation (PAM) techniques and, additionally, incorporating a separate transmission channel for a clock signal, eliminating the need for clock recovery circuitry on the receive end of the arrangement.

In accordance with the present invention, a multi-level PAM signal is created from the parallel data word to create an encoded stream that is able to transmit multiple bits at the same time, eliminating the need to completely serialize the parallel data word at the edge of a chip. The PAM may be performed on the entire word, or a partial PAM technique may be employed. For example, a PAM-16 optical modulation technique may be utilized to simultaneously transmit 4 bits. In general, a PAM-$N^2$ modulation technique is used to simultaneously transmit N bits of data.

In a preferred embodiment of the present invention, an optical Mach-Zehnder interferometer (MZI) is used to create the PAM output signal from the parallel word input signal. A second MZI is then used to separately transmit the clock signal, in parallel with the PAM signal, eliminating the need to perform clock recovery on the receive end. The optical clock signal may be transmitted over the same signal path (generally, fiber) as the PAM output data signal using a different wavelength, or may be transmitted over a second, separate optical fiber using the same wavelength.

Advantageously, the created optical clock signal can be further distributed across the chip and provide a frequency-locked clocking arrangement.

Other and further embodiments and advantages of the present invention will become apparent during the course of the following discussion and by reference to the accompanying drawings, where like numerals represent like parts in several views.

BRIEF DESCRIPTION OF THE DRAWINGS

Referring now to the drawings,

FIG. 6 shows an alternative embodiment of the optical interconnection arrangement of the present invention, using same wavelength to transmit both the PAM data signal and optical clock, providing separate optical fibers to transmit both signals; and FIG. 7 illustrates an alternative optical clock configuration that may be used in the arrangement of FIG. 5 or 6, the alternative configuration including a second (spare) clock source, as well as an optical splitting arrangement for distributing a frequency-locked optical signal to various areas of the computing chip.

DETAILED DESCRIPTION

As mentioned above, today's data centers rely on thousands of computing nodes, coupled together with high speed interconnects, to achieve the performance metrics of today's applications. Each computing node consists of an IC (chip) processor core that is used to perform various functions. The processing power of each node is continuing to sharply increase. However, the need to interconnect the nodes at high speed, low power and even lower latency is outpacing the available technologies of today.

Figure 1:
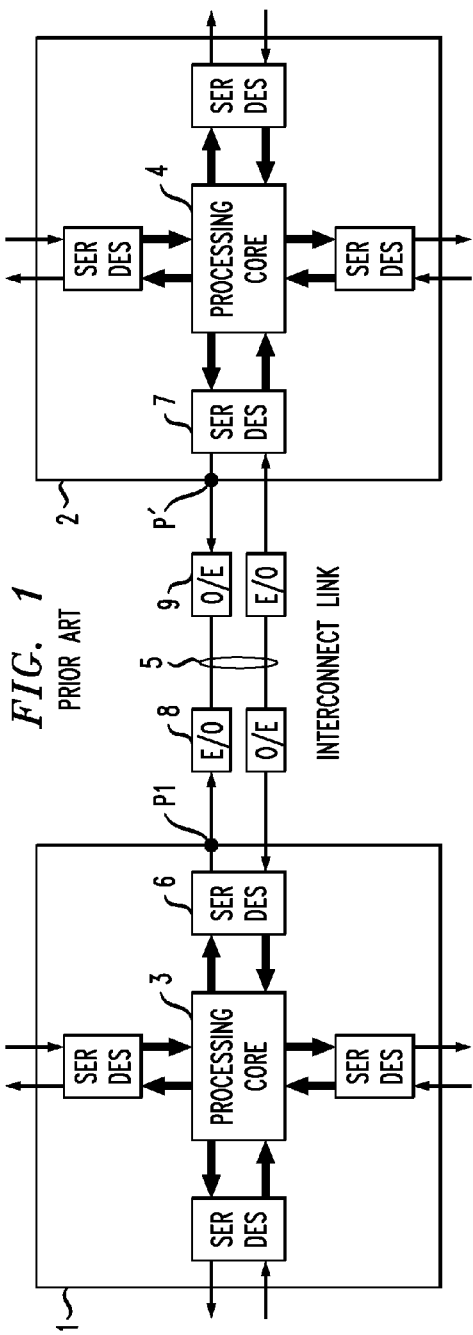
FIG. 1 is a block diagram of an exemplary data communication arrangement between a first chip and a second chip, each having a processing core that utilizes parallel data words and an interconnection that utilizes serial data transmission; a conventional prior art optical-based interconnection arrangement using the SERDES functionality.

FIG. 1 illustrates a conventional prior art optical interconnect arrangement between a first chip 1 and a second chip 2. Chip 1 includes a processing core 3 that functions to manipulate massive amounts of data in a parallel word format. A similar processing core 4 is included within chip 2, and there is a need to provide communication between chips 1 and 2 via an optical interconnect link 5. It is to be understood that only a single link 5 is shown for the purposes of clarity. In a moderately-complex system, there will be tens of thousands of such links. Moreover, while FIG. 1 shows a set of four outputs from chips 1 and 2, it is to be understood that there may be additional sets of outputs, linking these chips to more than four other nodes.

As shown, the parallel word data exiting/entering each processing core is first passed through an associated SERDES device, where a SERDES 6 is associated with processing core 3 and a separate SERDES 7 is associated with processing core 4. Presuming the communication path is from first chip 1 to second chip 2, the parallel data word exiting processing core 3 is thereafter serialized within SERDES 6 and exits first chip 1 at, for example, an electrical connection pin P1. Thereafter, the serialized electrical signal is transformed into an optical replica within an electrical/optical (E/O) conversion device 8 and coupled into optical interconnect link 5 for transmission to second chip 2. At the periphery of second chip 2, the optical signal is then converted into electrical form within an optical/electrical (O/E) conversion device 9 and applied as an input to the "deserializing" portion 7-D of SERDES 7, which functions to de-serialize the data and reproduce it in parallel word form.

While not shown in detail, it is obvious that similar transmission paths are used in the opposite direction to transmit data back from second chip 2 to first chip 1. Indeed, all of the interconnections are presumed to be bidirectional in form.

As mentioned above, SERDES 6, 7 and E/O, O/E conversion devices 8, 9 consume significant power and are known to add latency to the overall system. Moreover, for high data rate applications, the bandwidth of these various components needs to be quite large, requiring even greater electrical power.

Figure 2:
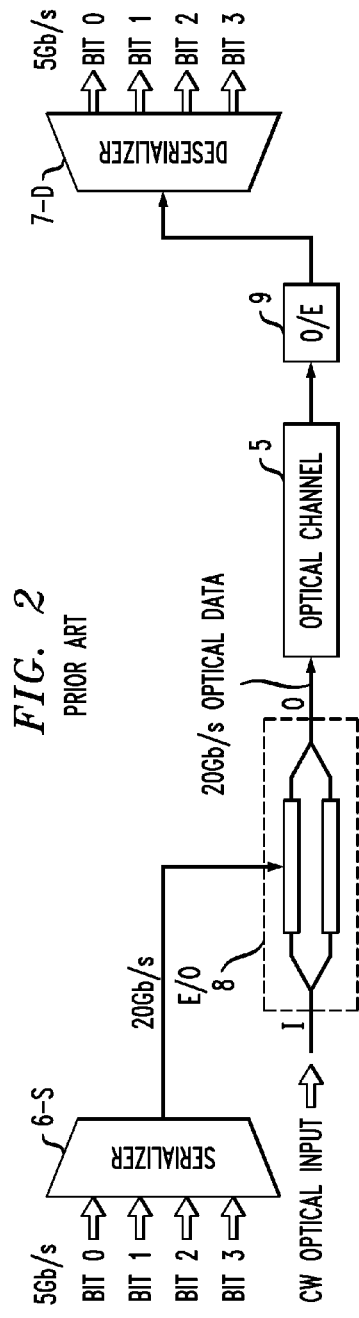
FIG. 2 illustrates an exemplary prior art implementation of an optical-based interconnection arrangement using the SERDES functionality for use in the arrangement of FIG. 1.

FIG. 2 is a diagram of a conventional prior art optical interconnect arrangement as may be deployed in the system of FIG. 1. In this case, it is desired to transmit a 4-bit wide parallel data word, each bit operating at a data rate of, for example, 5 Gb/s (any other data rate, of course, may be utilized). The four parallel data bits are applied as separate inputs to the serializer portion 6-S of SERDES 6. The four separate streams operating at an exemplary rate of 5 Gb/s are thus combined to form a single output data stream operating at a data rate of 20 Gb/s. In the particular embodiment of FIG. 2, the E/O conversion occurs within a Mach-Zehnder interferometer (MZI) formed within E/O conversion device 8, where a continuous wave (CW) optical input signal I is applied as a separate input and the electrical data signal is used to create a modulated optical output signal O. Optical output signal O is thereafter coupled into and propagates along optical channel 5 (which may be a fiber, integrated optical waveguide or other suitable optical communication medium). O/E conversion device 9, located at the periphery of second chip 2, then re-converts the received 20 Gb/s optical signal into a serial electrical data signal (at 20 Gb/s). The de-serializing portion of SERDES 7 (denoted as 7-D in FIG. 2) will then separate the signals along four output data paths, each operating at the same data rate as the set of signals exiting first chip 1, in this case, 5 Gb/s. For this particular data rate, the bandwidth of modulator 8, O/E converter 9, serializer 6-S and de-serializer 7-D all need to be on the order of 20 GHz (presuming an input data rate of 5 Gb/s for four channels), requiring significant electrical power.

Figure 3:
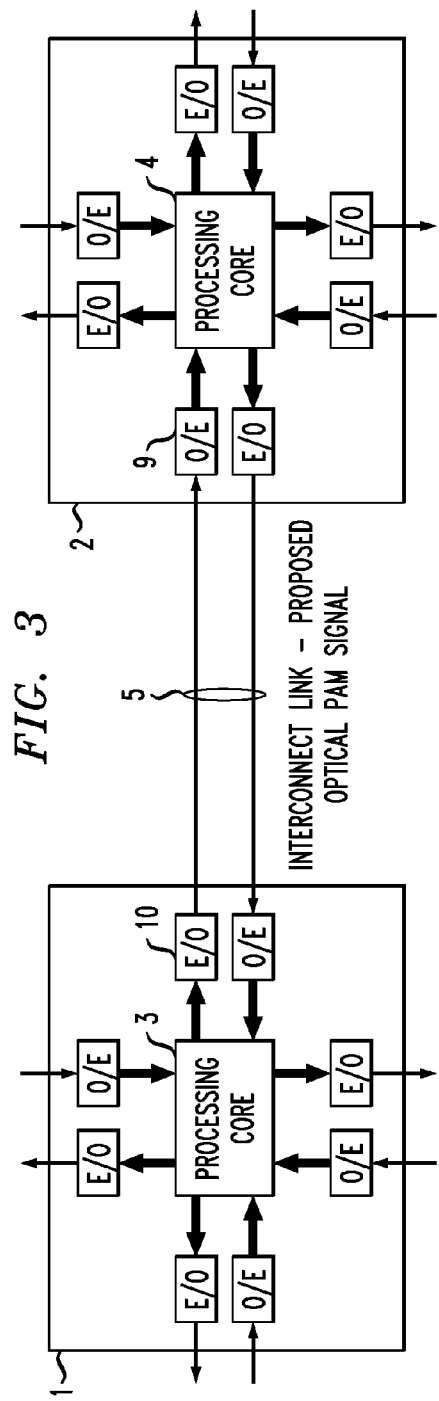
FIG. 3 is a block diagram of an exemplary data communication arrangement, where the SERDES functionality shown in FIG. 1 is replaced with a direct optical interconnection arrangement.

An improvement over the prior art arrangement shown in FIGS. 1 and 2 can be realized by modifying the optical modulation technique to allow for an $N^2$-level signal to be used for simultaneously transmitting N data bits, eliminating the need for the SERDES operations at the output of processing cores 3 and 4. FIG. 3 contains a block diagram of an exemplary $N^2$-level, direct optical arrangement. Again presuming a communication path where N=4 (i.e., a 4-bit parallel word is exiting processing core 3), the 4-bit parallel word is directly applied as an input to an appropriate type of E/O conversion device 10 for encoding all four bits into a 16-level optical output signal which is thereafter transmitted along interconnect link 5. At the receive end, an O/E conversion is first performed, followed by a conversion of the 16-level signal into the separate data signals for use by second processing core 4.

Figure 4:
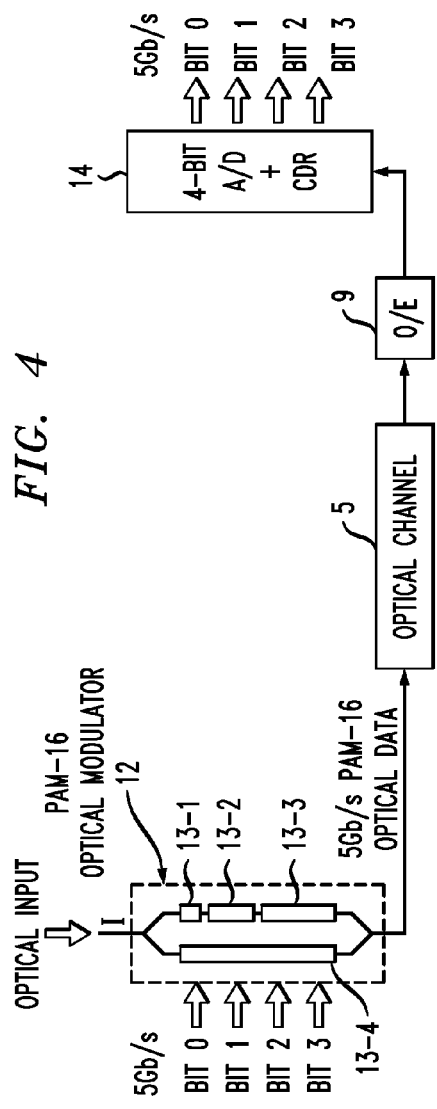
FIG. 4 illustrates an exemplary direct optical interconnection arrangement that may be used in the arrangement of FIG. 3, where a pulse amplitude modulation (PAM) scheme is used to simultaneously transmit multiple data bits.

FIG. 4 is a specific embodiment of the type of $N^2$-level processing that may be utilized in the arrangement of FIG. 3. As shown in this specific embodiment, a 4-bit parallel word is applied as an input to an optical modulator 12 (it is to be understood that various other arrangements, including but not limited to 8-bit, 16-bit, 64-bit, etc. may also be used). Similar to the prior art arrangement described above, the data may be streaming at a rate of 5 Gb/s, although any other data rate may be used. In contrast to the prior art arrangement of FIG. 2, the four separate bits are not first serialized, but are applied as simultaneous inputs to optical modulator 12. In this specific embodiment, optical modulator 12 comprises a pulse amplitude modulator (PAM) which utilizes the four input signals to generate a PAM-16 optical output signal. A complete discussion of the utilization of an optical PAM arrangement for this application can be found in U.S. Pat. No. 7,483,597, issued to K. Shastri et al. on Jan. 27, 2009, assigned to the assignee of this application and herein incorporated by reference. In this case, by controlling the length of a plurality of modulating segments 13-1, 13-2, 13-3 and 13-4 formed along modulator 12, with the four parallel bits coupled to the separate modulating segments 13, a PAM-16 modulated optical output signal is formed that retains the original input data rate (for example, 5 Gb/s). Other multi-segment arrangements of modulator 12 may be used, where increasing the number of segments allows for an increase in linearity of the output signal. Additionally, as mentioned above, the data rate of 5 Gb/s is considered to be exemplary only; any other suitable data rate can be used in the system of the present invention.

By maintaining the data rate of the input data stream, the optical channel may experience less dispersion-based loss and O/E conversion device 9 will consume less power in performing the O/E conversion at second chip 2. In this particular application, a 4-bit A/D converter and clock-data recovery (CDR) circuit 14 are utilized instead of a de-serializer to recover the four separate data bits.

While an improvement over the arrangement of FIGS. 1 and 2, the "direct optical" embodiment of FIGS. 3 and 4 still requires the use of a CDR at the receive side of the communication path, which still consumes a significant amount of power and may introduce error into the system, all at a cost of increased latency.

In accordance with the present invention, it has been found that the need for a CDR at the receive side of each optical interconnect path can be eliminated by simultaneously transmitting an optical clock signal in parallel with the PAM optical data signal, using the transmitted clock signal to control the receive-side A/D converter. By eliminating the CDR operation along each link, a significant savings in power has been realized, while also reducing the latency of the system.

Figure 5:
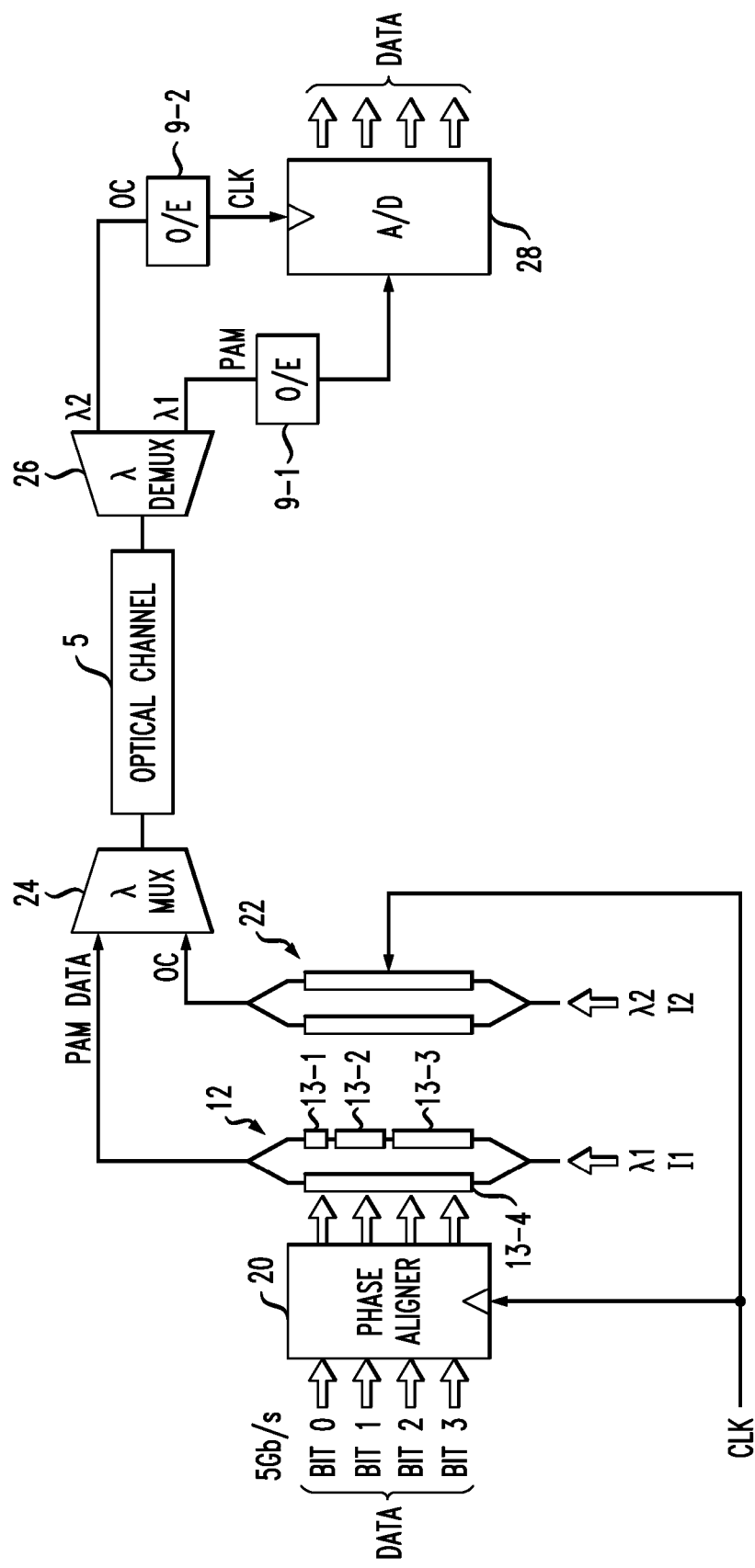
FIG. 5 contains an exemplary embodiment of an optical interconnection arrangement of the present invention, utilizing a first MZI to encode the parallel electrical data into a PAM optical signal and a second MZI to transmit the clock signal, eliminating the need for a CDR at the receiving end.

FIG. 5 contains a diagram illustrating an exemplary optical interconnect formed in accordance with the present invention to include a second signal path for transmitting an optical clock signal in parallel with the PAM optical data signal. Similar to the arrangement described above in association with FIGS. 3 and 4, a PAM modulator 12 is used to transmit an $N^2$-level optical signal based on a parallel N-bit data input. The embodiment in this case is where N=4; obviously, any other suitable value of N may be utilized.

As shown, the 4-bit parallel bit word is applied as an input to a phase aligner 20 (for the sake of discussion, it is presumed that each data input is operating at a rate of 5 Gb/s, obviously any other suitable data rate may be used). A separate clock input is applied to phase aligner 20 and used to maintain synchronous operation of the four separate data streams. In one exemplary embodiment, a set of D flip-flops may be used to form phase aligner 20. The "clocked" data signals are thereafter applied as separate inputs to PAM modulator 12, with a CW optical input signal I at a first wavelength $\lambda 1$ used as the optical input to modulator 12. Again, optical modulator 12 comprises a multi-segment modulator capable of forming a PAM output signal, with the number of segments contributing to the linearity of the output (i.e., increasing the number of segments will result in the ability to appropriately tailor the output to better follow the phase transfer function of the modulator). The output from modulator 12 is therefore a pulse amplitude modulated optical signal (also referred to as a "PAM optical data signal"), representing all N bits of the input data signal.

In accordance with the present invention, the electrical clock signal is applied as an input to a separate modulator 22. In this specific embodiment of FIG. 5, a second CW light source, operating at a second wavelength $\lambda 2$, is used as the optical input to modulator 22, thus creating at the output an optical clock signal OC. As shown in FIG. 5, modulator 22 is formed to exhibit essentially the same dimensions as PAM modulator 12, so that the optical signal propagating along modulator 22 will experience essentially the same propagation delay as the optical signal propagating along modular 12, thus allowing optical clock signal OC to remain synchronized with PAM modulated optical data signal.

As shown in FIG. 5, PAM optical data signal and optical clock signal OC are then applied as separate inputs to an optical multiplexer 24, which combines the signals at wavelengths $\lambda 1$ and $\lambda 2$ onto optical channel 5 for transmission to second chip 2. Upon receipt at chip 2, the PAM data and clock signals are separated within an optical demultiplexer 26, with the PAM optical data signal at wavelength $\lambda 1$ applied as an input to a first O/E converter device 9-1 and the optical clock signal OC at wavelength $\lambda 2$ applied as an input to a second O/E converter device 9-2. The converted electrical data signal output from device 9-1 is then applied as an input to an A/D converter 28, with the electrical clock signal output from O/E converter device 9-2 applied directly as the clock input to A/D 28.

It is an important feature of the arrangement of the present invention that the simultaneous transmission of the clock signal with the data signal along optical channel 5 allows for the clock to directly synchronize the received data and avoids the need to perform "clock recovery" from the PAM optical data signal at the receive side of the channel. Eliminating the need for a CDR thus reduces the overall power consumed by the arrangement and reduces the latency of the system.

FIG. 6 illustrates an alternative embodiment of the optical interconnection arrangement of the present invention. In this case, the optical clock is created at the same wavelength $\lambda 1$ as PAM optical data signal and is then transmitted over a separate optical fiber between first chip 1 and second chip 2. Referring to FIG. 6, where the same reference numerals are maintained for similar components, the clocked data output from phase aligner 20 is applied as the electrical input to modulator 12 and the original clock signal is applied as the input to second modulator 22, as with the embodiment of FIG. 5. In this case, however, the same CW laser source is used to provide the optical input signal to both modulators 12 and 22. That is, the output from a CW laser source is passed through an optical splitter 29 and coupled into the optical input of both modulators 12 and 22. Thus, at the output of modulators 12 and 22 will be optical signals operating at the same wavelength, albeit with different modulation characteristics. In accordance with this embodiment of the present invention, a multiplexer is not required; instead, optical channel 5 is formed to include a pair of optical fibers 5-1 and 5-2, with PAM optical data signal coupled into first fiber 5-1 and optical clock signal OC coupled into second fiber 5-2. The pair of signals then propagate along the path to second chip 2, where PAM optical data signal along fiber 5-1 is then applied as an input to first O/E converting device 9-1 and optical clock signal OC along fiber 5-2 applied as an input to second O/E converting device 9-2. The subsequent processing is essentially the same as that described above in association with FIG. 5.

In the embodiment of FIG. 6, there is trade-off between eliminating the need for a second optical laser at another wavelength and the wavelength mux/demux components, and the need for using a second optical fiber and necessary couplings at either end of the arrangement.

Further, it is possible to expand the utilization of the created optical clock signal to provide clock signal that is distributed to various optical element(s) or a combination of elements within a system. FIG. 7 illustrates one exemplary optical clock distribution arrangement 30 that may be utilized as modulator 22, where one output from arrangement 30 is applied as the optical clock input to, for example, optical multiplexer 24 or optical fiber 5-2, with the remaining optical clock signals distributed to other optical system components.

Referring to FIG. 7, it is shown that arrangement 30 may also utilize a second source of a CW optical input signal, denoted second source 32, to be used as a back-up source upon recognition of a failure of the original source (a "failure" may also be defined as the output power from a first source falling below a predetermined threshold value). In this balanced configuration, both an electrical clock signal and its inverse (shown as CLK and $\overline{\text{CLK}}$ in FIG. 7) are applied as inputs to an MZI 34 and used to modulate the CW optical signal, generating the optical clock OC output signal and its inverse, shown as $\overline{\text{OC}}$.

As shown in FIG. 7, arrangement 30 further comprises an optical splitting arrangement 36 formed of a plurality of branching waveguides, with optical splitter 36 coupled to the outputs of MZI 34. Each of the waveguiding sections thus carries optical clock signal OC propagating at wavelength $\lambda 2$. One output waveguide 38 is shown as thereafter being used as the OC input to optical multiplexer 24 (see FIG. 5). The remaining OC, signals are available to be distributed to various other optical systems located on the same chip, where these signals remain frequency-locked. Advantageously, the ability to distributed a frequency-locked optical clock eliminates the need for CDRs at various locations within the optical system. While not explicitly shown, it is to be understood that the PAM optical data signal could be passed through a similar optical splitting arrangement and distributed across the chip to various optical nodes that would utilize this data.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the claims appended hereto.

What is claimed is:

1. An optical interconnection arrangement for transmitting high speed data signals, the arrangement comprising:
   a transmitting component associated with a first processing node for converting an electrical high speed data signal into an optical data signal;
   an optical transmission channel coupled to the output of the transmitting component; and
   a receiving component associated with a second processing node and coupled to the output of the optical transmitting channel for receiving the optical data signal and re-converting the received optical data signal into the original electrical high speed data signal, wherein
   the transmitting component comprises:
      a phase alignment element responsive to a plurality of N of parallel data signals and an electrical clock signal to create as an output a plurality of parallel, phase-aligned data signals;
      a first optical modulator responsive to the plurality of N parallel phase-aligned data signals and a continuous wave (CW) optical signal to create a pulse amplitude modulated (PAM) optical data signal representative of the plurality of N parallel phase-aligned data signals; and
      a second optical modulator responsive to the electrical clock signal and a CW optical signal to create an optical clock output signal; and
   the receiving component comprises:
      a first optical/electrical (O/E) conversion device responsive to the received PAM optical data signal to create an electronic version thereof;
      a second O/E conversion device response to the received optical clock signal to create an electronic version thereof; and
      an A/D converter responsive to the outputs of the first and second O/E conversion devices to recover the original plurality of N parallel data signals therefrom.

2. An optical arrangement as defined in claim 1 wherein the transmitting component first and second optical modulators comprise first and second Mach-Zehnder interferometers, respectively.

3. An optical arrangement as defined in claim 2 wherein the first Mach-Zehnder interferometer comprises a multi-segment interferometer.

4. An optical arrangement as defined in claim 3 wherein the first Mach-Zehnder interferometer creates a PAM-$N^2$ output signal from a plurality of N parallel data signals.

5. An optical arrangement as defined in claim 1 wherein
   the transmitting component further comprises:
      a first optical signal source operating at a first wavelength $\lambda 1$ coupled to the input of the first optical modulator;
      a second optical signal source operating at a second wavelength $\lambda 2$ coupled to the input of the second optical modulator; and
      an optical multiplexer for coupling the optical output signals from the first and second optical modulators onto a single optical output signal path; and
   the receiving component further comprises:
   an optical demultiplexer for separating the PAM data signal propagating at wavelength $\lambda 1$ from the optical clock signal propagating at wavelength $\lambda 2$, and coupling each signal into a separate optical signal path.

6. An optical arrangement as defined in claim 1 wherein
   the transmitting component further comprises:
      an optical source operating at a wavelength $\lambda 1$; and
      an optical splitter for directing a first portion of the output from the optical source to the optical input of the first optical modulator and a second portion of the output from the optical source to the optical input of the second optical modulator; and
   the optical transmission channel comprises a pair of optical fibers, a first fiber supporting the propagation of the PAM optical data signal and a second fiber supporting the propagation of the optical clock signal.

7. An optical arrangement as defined in claim 1 wherein the second optical modulator further comprises an optical clock distribution arrangement for dispersing a plurality of frequency-locked optical clock signals across the first processing node.

8. An optical arrangement as defined in claim 7 wherein the optical clock distribution arrangement comprises an optical splitter coupled to the output of the second optical modulator, wherein the optical splitter comprises a plurality of branching waveguides for dispersing the plurality of frequency-locked optical clock signals across the first processing node.

9. An optical arrangement as defined in claim 7 wherein the second optical modulator further comprises a second CW optical input signal source for utilization as a back-up source upon recognition of a failure of the original CW source.

10. An optical arrangement as defined in claim 1 wherein the first optical modulator further comprises a pair of CW optical input signal sources for providing the optical signal thereto, wherein a second CW optical input signal source of said pair is utilized as a back-up source upon recognition of a failure of a first CW optical input signal source of said pair of CW optical input signal sources.

* * * * *